US012597353B1

(12) United States Patent
Hansen et al.

(10) Patent No.: US 12,597,353 B1
(45) Date of Patent: Apr. 7, 2026

(54) RIDESHARING FLEET MANAGEMENT

(71) Applicant: United Services Automobile Association (USAA), San Antonio, TX (US)

(72) Inventors: Gregory D. Hansen, San Antonio, TX (US); Will K. Maney, San Antonio, TX (US); William P. Culbertson, II, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/432,755

(22) Filed: Feb. 5, 2024

Related U.S. Application Data

(63) Continuation of application No. 17/036,989, filed on Sep. 29, 2020, now Pat. No. 11,922,816.

(60) Provisional application No. 62/908,295, filed on Sep. 30, 2019.

(51) Int. Cl.

| | |
|---|---|
| ***G08G 1/00*** | (2006.01) |
| ***B60W 60/00*** | (2020.01) |
| ***G01C 21/34*** | (2006.01) |
| ***G06F 21/31*** | (2013.01) |
| ***G06Q 10/02*** | (2012.01) |

(Continued)

(52) U.S. Cl.
CPC ......... *G08G 1/202* (2013.01); *B60W 60/0016* (2020.02); *B60W 60/00253* (2020.02); *G01C 21/3438* (2013.01); *G06F 21/31* (2013.01); *G06Q 10/02* (2013.01); *G06Q 30/0284* (2013.01); *G06Q 50/40* (2024.01)

(58) Field of Classification Search
CPC ............... G08G 1/202; B60W 60/0016; G01C 21/3438; G06F 21/31; G06Q 10/02; G06Q 30/0284; G06Q 50/40
See application file for complete search history.

(56) References Cited

U.S. PATENT DOCUMENTS

2015/0032485 A1* 1/2015 Nelson .................. G06Q 10/02 705/5
2016/0364678 A1* 12/2016 Cao ...................... G06Q 10/083
2017/0213165 A1* 7/2017 Stauffer ................ G06Q 10/02

(Continued)

FOREIGN PATENT DOCUMENTS

WO WO-2016135536 A1 * 9/2016 ............ G06T 11/00

OTHER PUBLICATIONS

Jeong Y, Son S, Lee B. The Lightweight Autonomous Vehicle Self-Diagnosis (LAVS) Using Machine Learning Based on Sensors and Multi-Protocol IoT Gateway. Sensors (Basel). Jun. 3, 2019;19(11):2534. (Year: 2019).*

*Primary Examiner* — Joan T Goodbody
(74) *Attorney, Agent, or Firm* — BakerHostetler

(57) ABSTRACT

A system for managing a fleet of shared autonomous vehicles may comprise a plurality of specialized sub-systems. The sub-systems may coordinate to service requested rides using the vehicles. The system may comprise a reservation system configured to receive a request for a ride from a user device. The system may comprise a coordination system configured to determine a price for the requested ride. The system may comprise a routing system configured to determine a vehicle of the fleet to service the requested ride and/or a route for the requested ride. The determined vehicle may be caused to service the requested ride.

22 Claims, 6 Drawing Sheets

(51) Int. Cl.
*G06Q 30/0283* (2023.01)
*G06Q 50/40* (2024.01)

(56) References Cited

U.S. PATENT DOCUMENTS

| | | | | |
|---|---|---|---|---|
| 2018/0101355 | A1* | 4/2018 | van Laack | H04R 3/12 |
| 2018/0259976 | A1* | 9/2018 | Williams | G06Q 50/40 |
| 2019/0041852 | A1* | 2/2019 | Schubert | G06Q 10/0836 |

* cited by examiner

300

400

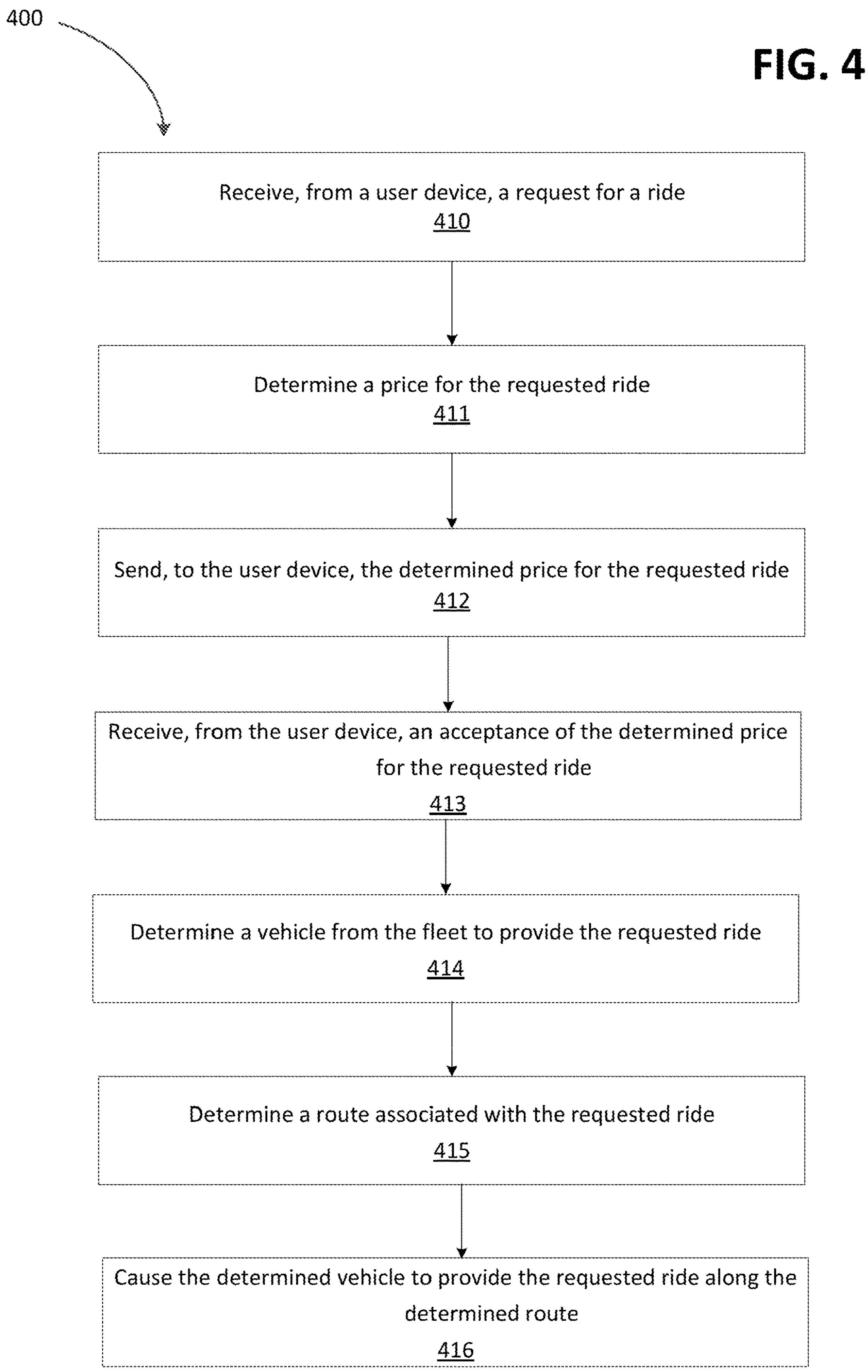

FIG. 4

Receive, from a user device, a request for a ride
410

Determine a price for the requested ride
411

Send, to the user device, the determined price for the requested ride
412

Receive, from the user device, an acceptance of the determined price for the requested ride
413

Determine a vehicle from the fleet to provide the requested ride
414

Determine a route associated with the requested ride
415

Cause the determined vehicle to provide the requested ride along the determined route
416

RIDESHARING FLEET MANAGEMENT

CROSS-REFERENCE TO RELATED APPLICATION

This patent application is a continuation of U.S. patent application Ser. No. 17/036,989, filed Sep. 29, 2020, which claims priority to and the benefit of provisional patent application No. 62/908,295 filed Sep. 30, 2019, which is incorporated herein by reference in its entirety.

BACKGROUND

The adoption of autonomous vehicles may present several challenges to traditional ridesharing fleet management systems, as traditional systems may be configured for non-autonomous vehicles. Ridesharing fleet management systems that take into account the unique features of autonomous vehicles are needed.

SUMMARY

A system for managing a fleet of shared autonomous vehicles may comprise a plurality of specialized sub-systems. The sub-systems may coordinate to service ride requests. The system may comprise a reservation system that communicates with user devices, such as by receiving ride requests from the user devices. The fleet management system may comprise a coordination system that determines prices associated with the rides. The fleet management system may comprise a routing system that determines routes for the rides. The fleet management system may comprise a maintenance system that determines statuses of vehicles in the fleet. The fleet management system may comprise the fleet of autonomous vehicles that provide the rides to passengers.

BRIEF DESCRIPTION OF THE DRAWINGS

The following drawings show generally, by way of example, but not by way of limitation, various examples discussed in the present disclosure. In the drawings:

FIG. 4 shows an example ridesharing fleet management method.

DETAILED DESCRIPTION

As autonomous vehicles (AV's) enter a market-ready state of development, AV's will likely be adopted for ridesharing services. However, traditional ridesharing fleet management systems are not configured to manage fleets of AV's. For example, traditional ridesharing fleet management systems may employ logic that relies on inputs provided by human drivers. As another example, the management of fleets of autonomous vehicles for ridesharing services may be optimized by employing novel rules based on factors unique to AV's. Therefore, ridesharing fleet management systems configured to manage fleets of AV's are needed.

Figure 1:
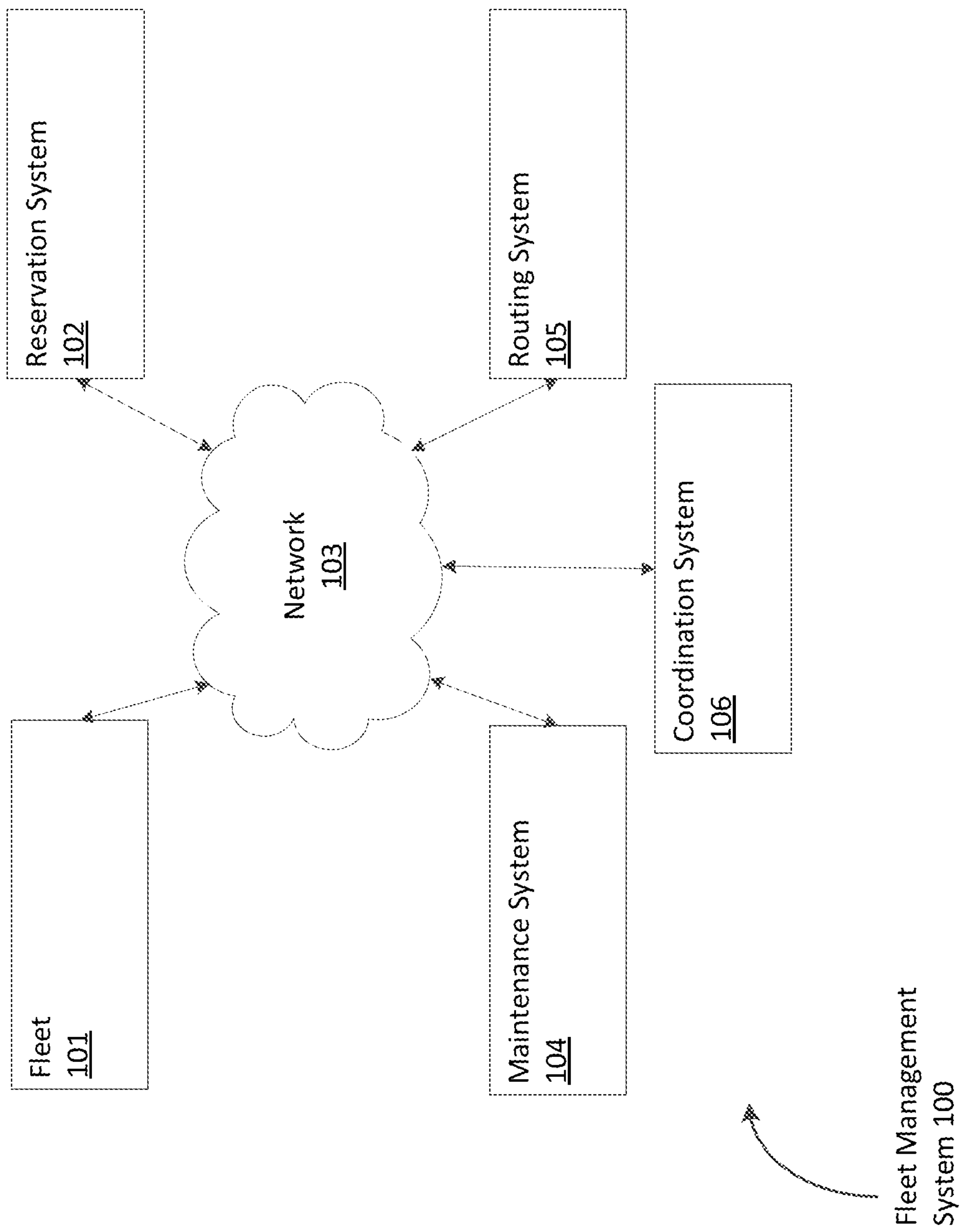
FIG. 1 shows an example ridesharing fleet management system.

FIG. 1 shows an example ridesharing fleet management system 100. The ridesharing fleet management system 100 may comprise a plurality of specialized sub-systems and/or components. The components may be configured to coordinate to provide ride to passengers and/or to provide transportation of other payloads, such as cargo.

The ridesharing fleet management system 100 may comprise a fleet of vehicles 101. A vehicle of the fleet 101 may comprise an AV. A vehicle of the fleet 101 may comprise a non-AV. The fleet 101 may comprise both vehicles that are AV's and vehicles that are non-AV's. A vehicle of the fleet 101 may comprise a car, a truck, an aerial vehicle, a train, or a boat, and/or other types of vehicles. A vehicle of the fleet 101 may be configured to carry passengers, cargo, animals, and/or other payloads.

The fleet 101 may comprise one or more vehicles having intelligent functionality. For example, the fleet 101 may comprise one or more vehicles having telematics units. A telematics units may comprise one or more processors, memory, and/or one or more sensors, as examples. A sensor may comprise a weight sensor, a noise sensor, a pressure sensor, an oxygen sensor, a motion sensor, a temperature sensor, and/or another type of sensor. A telematics unit may be configured to determine operating properties of a vehicle of the fleet 101, such as fuel level, battery level, oil level, speed, velocity, acceleration, rotation per minute (RPM), maintenance history, needed maintenance, and/or distance traveled, as examples. A telematics unit may be configured to determine properties of a cabin, passenger compartment, and/or storage compartment of a vehicle, such as temperature, payload weight, oxygen level, sound level, interior damage, and/or ambient light level of a cabin and/or compartment, as examples.

A telematics unit may be configured to determine that a payload, such as a passenger, luggage, or other cargo, has entered a vehicle of the fleet 101. A telematics unit may be configured to determine that a payload has been removed from a vehicle. For example, a telematics unit may be configured to determine that one or more passengers have exited a vehicle. A telematics unit may be configured to determine that personal effects have been removed from a vehicle. As another example, a telematics unit may be configured to determine whether an object has been left in a vehicle by a passenger. As another example, a telematics unit may be configured to determine that cargo has been placed in a vehicle and/or removed from a vehicle.

Determining the change in payload may be triggered by another event. For example, a telematics unit may be configured to determine a change in payload in response to a door of the vehicle opening or closing. As another example, a telematics unit may be configured to determine a change in payload based a vehicle arriving at a destination.

Determining the entry, removal, and/or exit of a payload may be based on determining a change in payload weight. For example, a telematics unit may comprise and/or be configured to communicate with a scale (e.g., a weight sensor). The scale may be calibrated to "O" before the vehicle is deployed to a pickup point and/or before the vehicle is accessed (e.g., opened, occupied) by a passenger. A reading of the scale before the vehicle is deployed and/or accessed by a passenger may be recorded. A reading of the scale when the vehicle is deployed, after the vehicle is deployed, when the vehicle is accessed, and/or after the vehicle is accessed may be recorded. The readings from different times may be compared. An increase in the scale measurements may indicate that a payload has entered the vehicle. A decrease in scale measurements may indicate that a payload has been removed and/or has exited the vehicle.

A telematics unit may be configured to determine the entry, removal, and/or exit of a payload by generating a heatmap of an interior of a vehicle, such as using one or more cameras installed in the vehicle. A heatmap may be generated based on one or more particular events. A heatmap may be generated before a vehicle is deployed, when the vehicle is deployed, after the vehicle is deployed, before the vehicle is accessed, when the vehicle is accessed, and/or after the vehicle is accessed. Heatmaps may be generated continuously, at time intervals, and/or based on reaching segments of routes (e.g., a pickup point, a beginning of a route, a first quarter of a route, a half-way point of a route, a three-quarters point of a route, a route destination, etc.). The heatmaps generated at different times may exhibit different characteristics based on the entry, removal, and/or exit of a payload.

The heatmaps may be compared. Differences in the heatmaps may be determined. The determined differences in the heatmaps may be used to determine changes in payloads. For example, based on a first heat map generated in a vehicle at a time X showing less heat than a second heat map generated at a time Y, where Y is a later time than X, it may be determined that a payload has entered the vehicle. Based on a first heat map generated in a vehicle at a time X showing more heat than a second heat map generated at a time Y, where Y is a later time than X, it may be determined that a payload has exited and/or been removed from the vehicle.

A telematics unit may be configured to determine that a payload before a ride or at a start of the ride is equal to a payload at the end of a ride or after the ride. If the payload before the ride and/or at the start of the ride is not equal to the payload at the end of the ride and/or after the ride, the telematics unit may be configured to send a notification, such as to a device associated with the ridesharing fleet management system 100 and/or a user.

Based on a vehicle reaching a destination point, the vehicle may be configured to not leave its current location until it is determined that a payload has exited or been removed from the vehicle. Based on arriving at the destination point and the payload not exiting or being removed, the vehicle may wait a predetermined period of time. After the predetermined period of time, if the payload has not exited or been removed from the vehicle, the vehicle may prompt a passenger to exit the vehicle and/or to remove objects from the vehicle. For example, a prompt may be output via audio and/or visual notifications. A prompt may be output via an output device of the vehicle, such as a display or a speaker. A prompt may be sent to a device associated with a passenger and/or a user. After a predetermined period of time after arriving at the route destination and/or outputting a prompt, the vehicle may be configured to send a notification to a computing device associated with the ridesharing fleet management system 100, another component of the ridesharing fleet management system 100, a central operator, an emergency service provider, a health provider, and/or a contact of the passenger and/or user, as examples.

As an illustrative example, a passenger may fall asleep in a vehicle and fail to exit upon arrival at the destination. Alternatively, a passenger may lose consciousness in a vehicle or experience another medical emergency preventing the passenger from exiting the vehicle at the destination. For any other reason, the passenger may not exit the vehicle when the vehicle arrives at the destination. As a result of the passenger not exiting the vehicle, the vehicle may determine that a current payload of the vehicle (e.g., the passenger's weight and/or the weight of the passenger's personal effects) is not zero, is not equal to a payload before the ride, and/or has not changed since the vehicle arrived at the destination point, as examples.

Based on the determination of the payload, the vehicle may be configured to output a notification. The notification may comprise an audible notification. The notification may comprise a visual notification, such as a flashing light. The notification may wake up the passenger and/or inform the passenger that the vehicle has arrived at the route destination.

The vehicle may be configured to determine a time that has elapsed after output of the notification. As a result of the elapsed time reaching a threshold time and the passenger having still not exited the vehicle (e.g., as a result of the passenger being unconscious or incapacitated), the vehicle may be configured to send a notification to a computing device associated with the ridesharing fleet management system 100, another component of the ridesharing fleet management system 100, a central operator, an emergency service provider, a health provider, and/or a contact of the passenger and/or user, as examples.

As another illustrative example, a passenger may exit a vehicle and leave behind a personal item, such as a bag, an umbrella, a phone, or a jacket, as examples. As a result of the item being left in the vehicle, the vehicle may be configured to determine that a current payload of the vehicle (e.g., the weight of the passenger's item) is not zero, is not equal to a payload before the ride, and/or has not changed since the vehicle arrived at the destination point, as examples. Based on the determination of the payload, the vehicle may be configured to send a notification to a computing device associated with the ridesharing fleet management system 100 and/or the passenger. For example, the vehicle and/or the ridesharing fleet management system 100 device may send a notification to a mobile phone of the passenger indicating that the passenger left an item. The vehicle may be configured to remain at its current location (e.g., the destination point of a route) to give the passenger a chance to retrieve the item before the vehicle leaves the current location.

A telematics unit may be configured to determine biometric data associated with one or more passengers and/or animals in a vehicle. As an example, the telematics unit may be configured to determine heartrate and/or body temperature of the passenger and/or animal in the vehicle. The telematics unit may be configured to determine a change in the biometric data. The telematics unit may be configured to determine that the biometric data is outside a normal range. Based on the change in the biometric data and/or the biometric data being outside the normal range, the telematics unit may be configured to determine an emergency.

Based on determining the emergency, the telematics unit may be configured to cause the vehicle to stop. For example, the telematics unit may cause the vehicle to park in a nearest parking lot or to pull over on the side of a road. Based on determining the emergency, the telematics unit may be configured to cause the vehicle to change a route. For example, the telematics unit may re-route the vehicle to a nearest emergency services provider or healthcare provider, instead of to an original destination. Based on determining the emergency, the telematics unit may be configured to output a notification. The notification may comprise an audible notification, such as a notification output via a speaker installed in the vehicle. The notification may comprise a visual notification, such as a activation of a light installed in the vehicle and/or output of the notification via a display installed in the vehicle.

Based on determining the emergency the telematics unit may be configured to prompt a passenger and/or user. For example, the passenger may be prompted to confirm that they are not experiencing an emergency. The prompting may comprise sending a notification to a device associated with the passenger, such as via an application running on a device of the passenger.

The prompting may comprise outputting the notification via an output installed in the device such as a speaker and/or a display (e.g., a touchscreen) installed in the vehicle. The passenger and/or user may respond to the prompt. The response may be received via an input installed in the vehicle, such as a microphone, a button, and/or a display. The response may be input and/or received via an application running on the device of the passenger. The passenger may respond that they are not experiencing an emergency. The passenger may not respond or may respond that they are experiencing an emergency. Based on the passenger responding that they are experiencing an emergency or no response being received, such as within a predetermined timeframe after prompting the passenger, a notification may be sent. The notification may be sent to a device associated with the fleet management system 100, a central operating center, an emergency services provider, a healthcare provider, an insurance provider, and/or someone associated with the passenger (e.g., a friend, a family member, etc.). Based on the passenger responding that they are not experiencing an emergency, no notification may be sent and/or the telematics unit may cause the vehicle to continue on its current route.

A telematics unit may comprise a communication unit. The communication unit may be configured to use Wi-Fi, Bluetooth, Radio Frequency (RF), and/or other communication methods. The communication unit may be configured to communicate with another vehicle (e.g., with a communication unit of another vehicle). The communication unit may be configured to communicate with one or more computing devices, such as a computing device associated with the ridesharing fleet management system 100 and/or a computing device associated with a passenger. The communication unit may be configured to communicate with one or more user devices, such as a mobile phone, a tablet, a desktop computer, and/or a laptop computer. A user device may comprise a device of a passenger and/or a device used to request a ride for a passenger. The communication unit may be configured to communicate with one or more traffic control devices.

The telematics unit may be configured to use the communication unit to communicate one or more operating properties of a vehicle, such as to a computing device, a user device, and/or a traffic control device. The telematics unit may be configured to use the communication unit to communicate biometric data associated with one or more passengers and/or animals in the vehicle. For example, based on the telematics unit determining an emergency, such as based on a change in biometric data or biometric data being outside a normal range, the telematics unit may use the communication unit to send the biometric data and/or a notification to a device associated with a central operating center, an emergency services provider, a healthcare provider, an insurance provider, and/or someone associated with the passenger (e.g., a friend, a family member, etc.).

The fleet 101 may comprise one or more vehicles configured to authenticate a passenger and/or user. For example, when a vehicle arrives at a pickup point, the vehicle may be configured to authenticate the passenger to determine that the passenger is the one who requested the ride and/or for whom the ride is designated. The vehicle may be configured to authenticate the passenger before giving the passenger access to the vehicle (e.g., unlocking one or more doors of the vehicle).

The vehicle may be configured to authenticate the passenger and/or user by communicating with a device of the user, such as via an application running on a mobile device of the user. For example, the vehicle may receive authentication data, such as a code and/or a token, from the device. The vehicle may be configured to authenticate the user by receiving authentication data via an input installed on the vehicle, such as a keypad, a combination lock, and/or a touchscreen. The input may be installed on an exterior of the vehicle, such as on or near a door of the vehicle. The vehicle may be configured to authenticate the user by receiving authentication data, such as a barcode and/or a QR code, via a reader installed on the vehicle. The vehicle may be configured to authenticate the user by receiving biometric authentication data, such as a retinal scan and/or a fingerprint scan. The vehicle may be configured to authenticate the user using facial recognition technology, and/or voice recognition technology, as examples. The vehicle may be configured to authenticate the user using a camera, scanner, sensor, and/or other device installed on the vehicle. The authentication device may be installed on the exterior of the vehicle, such as on or near a door of the vehicle.

If the received and/or determined authentication data matches stored and/or known authentication data associated with a requester of the ride, the passenger and/or user may be authenticated. Based on authenticating the passenger, the vehicle may give the passenger access to the vehicle. The vehicle may be configured to give the passenger access to the vehicle by causing one or more doors of the vehicle to unlock. The vehicle may be configured to give the passenger access to the vehicle by unlocking a steering wheel or an engine of the vehicle.

The fleet 101 may comprise one or more vehicles having self-cleaning functionality. For example, a vehicle may be configured to sanitize an interior compartment of the vehicle, such as between rides, before a ride, and/or after a ride, as examples. The vehicle may be configured to sanitize the interior compartment of the vehicle with sprays, infrared (IR) light, and/or heat, as examples. The vehicle may comprise a dirt and/or garbage collection unit, such as a vacuum and/or a drain. The vehicle may comprise a window and/or surface washer and/or wiper. The vehicle may comprise a dispenser and/or system for automatically changing sleeves, slips, and/or covers on and/or in the vehicle, such as disposable seat covers.

The ridesharing fleet management system 100 may comprise a reservation system 102. The reservation system 102 may comprise one or more computing devices. For example, the reservation system 102 may comprise a server or a network of servers, such as cloud computing devices. The reservation system 102 may be configured to communicate with one or more other components of the ridesharing fleet management system 100. The reservation system 102 may be configured to communicate with other components of the ridesharing fleet management system 100 via a network 103. The network 103 may comprise a Wi-Fi network, a 4G network, a 5G network, a cellular network, a broadband network, and/or another wireless network.

The reservation system 102 may comprise an application programming interface (API). The API may be configured to facilitate communication between one or more computing devices associated with the ridesharing fleet management system 100 and one or more devices associated with users and/or passengers. The API may be configured to facilitate communication between one or more components of the ridesharing fleet management system 100 and/or one or more devices associated with users and/or passengers.

The reservation system 102 may comprise an application configured for user devices. The application may comprise a rideshare service application. The application may comprise a mobile application. The application may comprise a graphic user interface. The application may comprise one or more fields for a user to enter information, such as a pickup point, a pickup time, a destination point, and/or an arrival time associated with the ride.

The API may be configured to receive and/or output data on the application. The reservation system 102 may be configured to receive ride requests from users via the application. A ride requests may comprise an indication of one or more route pickup point, one or more intermediary stopping points, and/or one or more destination points. The request may comprise an indication of a pickup time. The requests may comprise an indication of an arrival time.

The reservation system 102 may be configured to determine a price associated with a requested ride. The reservation system 102 may be configured to determine a price for the requested ride based on receiving the ride request. The price may be determined based on a temporal and/or physical length of the requested ride. The price may be determined based on a distance between a route destination and a pickup point of another route requested by another user for a ride starting at a similar time as an estimated arrival of the first route. The price may be determined based on a distance between the route destination and other locations of interest. For example, a route with a destination in a remote location may have a higher price than a route with a destination near a populated area where new passengers are likely to be located.

The price may be determined based on a time associated with the ride request. For example, prices may be higher at times when there are more ride requests than at times when there are fewer ride requests. The price may be determined based on historical data associated with numbers of ride requests received at certain times of day and/or on certain days of the week. The price may be determined based on a number of vehicles available at the requested time. The price may be determined based on a number of other users requesting rides, such as a number of users in a vicinity of the requesting user, who are also requesting rides at the time. The price may be determined based on a current fuel and/or electricity price.

The price may be determined based on a bidding process. For example, users may bid for an available vehicle of the fleet 101. Users may bid against other users in a geographic region. The ride request of a highest bidder may be accepted. The ride requests from the non-highest bidder may be denied. The ride requests from the non-highest bidder may be placed in a queue. The ride requests may be accepted and/or fulfilled in an order corresponding to a ride request of a highest bidder, then to a ride request of a next highest bidder, then to a ride request of a next highest bidder, etc. Alternatively, based on X vehicles of the fleet 101 being available, the ride requests of the X highest bidders may be accepted, where X can be any number.

The price may be increased based on delay in a passenger arriving to a pickup point. The price may be increased based on a user delaying in exiting a vehicle of the fleet 101. The price may be increased based on damage to a vehicle, such as to an interior and/or an exterior of the vehicle. The damage may be determined by a telematics unit of the vehicle and/or other sensors in the vehicle, such as cameras.

The reservation system 102 may be configured to determine a time associated with a ride request. The time may comprise an estimated wait time for arrival of a vehicle of the fleet 101 to a pickup point associated with the ride request. The time may comprise an estimated time for completion of the ride. The reservation system 102 may be configured to determine the time associated with the ride request based on receiving the ride request.

The reservation system 102 may be configured to output one or more responses to a ride request, such as via the application running on the user device. The response may comprise an indication of a determined price for the ride request. The response may comprise an indication of a number of available vehicles of the fleet 101. The response may comprise the time associated with the ride. The responses may comprise an option for a user to confirm a request for a ride and/or to accept the details of the ride, such as the price. Based on the user confirming the request and/or accepting the details of the ride, a vehicle of the fleet 101 may be deployed to the route pickup point.

The reservation system 102 may be configured to receive payment information from users, such as credit card information, debit card information, bank account information, cryptocurrency wallet information, and/or electronic payment system account information (e.g., Venmo, Paypal, Apple Pay, Android Pay, etc.). The reservation system 102 may be configured to receive the payment information via the application running on the user device. The reservation system 102 may be configured process the payment information to receive payment for a ride. The reservation system 102 may be configured to use the payment information to issue a refund, such as for an unfulfilled ride or in response to a user complaint.

The reservation system 102 may be configured to track passengers of vehicles, such as for health and safety measures. For example, if it is determined that a passenger that was in a vehicle is a carrier of a virus, the reservation system 102 may determine which vehicle the passenger occupied. The reservation system 102 may have the vehicle sterilized and/or put out of commission until it can be serviced. If the fleet 101 is outfitted with self-cleaning functionality, the reservation system 102 may cause the vehicle to perform additional self-cleaning. The reservation system 102 may determine one or more passengers that occupied the vehicle after the carrier passenger. The reservation system 102 may have the passengers contacted, such as to warn them of potential exposure.

The ridesharing fleet management system 100 may comprise a maintenance system 104. The maintenance system 104 may comprise one or more computing devices. For example, the maintenance system 104 devices may comprise a server or a network of servers, such as cloud computing devices. The maintenance system 104 devices may be configured to communicate with other components of the ridesharing fleet management system, such as with the vehicles of the fleet 101 and/or the reservation system 102. The maintenance system 104 may be configured to communicate via the network 103.

The maintenance system 104 may be configured to determine availability of one or more vehicles of the fleet 101. The maintenance system 104 may be configured to determine the availability of a vehicle based on one or more factors. The maintenance system 104 may be configured to determine a reservation status of the vehicles. For example, if a vehicle of the fleet 101 is driving to a route pickup point or is fulfilling a ride request (e.g., carrying a payload along a route), the vehicle may have a "reserved" status. A vehicle with a reserved status may not be available. A vehicle of the fleet 101 that has not been deployed to a ride, such as a parked vehicle or a vehicle that has completed a ride and is not driving to another ride may have an "unreserved" status. A vehicle with an unreserved status may be available to provide a ride and/or go to a pickup point of a requested ride.

The maintenance system 104 may be configured to determine the availability of one or more vehicles of the fleet 101 based on power levels of the vehicles. If a vehicle is electric and/or hybrid, the maintenance system 104 may determine a charging level or battery level of the vehicle. If a vehicle is non-electric or hybrid, the maintenance system 104 may determine a fuel level of the vehicle. If the power level and/or fuel level is below a threshold amount, the vehicle may be determined to be unavailable. The threshold amount may be determined based on an amount of power and/or fuel required for the vehicle to reach a pickup point associated with a ride request, to fulfill a ride request, and/or to travel from a parked area to a populated area, etc.

The maintenance system 104 may be configured to determine the availability of one or more vehicles of the fleet 101 based on locations of the vehicles. For example, the maintenance system 104 may be configured to determine a current location of a vehicle and a distance from the current location to a location of a user and/or a populated area.

The maintenance system 104 may be configured to determine the availability of one or more vehicles based on maintenance statuses of the vehicles. The maintenance system 104 may be configured to track a maintenance history of a vehicle. Based on a maintenance history of a vehicle, the maintenance system 104 may be configured to determine that the vehicle needs maintenance. The maintenance system 104 may be configured to determine that the vehicle needs maintenance based on data received from a device associated with the ridesharing fleet management system 100 or from the vehicle, such as from a telematics unit of the vehicle. The data received from the vehicle may indicate that a component of the vehicle is not working or is not performing optimally. Based on determining that the vehicle needs maintenance, the maintenance system 104 may be configured to determine that determine that the vehicle has an unavailable status.

The maintenance system 104 may be configured to communicate availability information associated with one or more vehicles of the fleet management system 100 to one or more components of the fleet management system 100, such as via the network 103. For example, the maintenance system 104 may be configured to communicate the information to the reservation system 102.

The availability information may comprise an availability status of one or more vehicles of the fleet 101, such as an available status or an unavailable status. The availability information may comprise a location of one or more available vehicles of the fleet 101. The availability information may comprise a number of vehicles available to satisfy a ride request.

The maintenance system 104 may be configured to communicate the information based on receiving an indication of a ride request. The maintenance system 104 may be configured to communicate the information based on receiving a request for availabilities of the one or more vehicles, such as from the component of the fleet management system 100. The maintenance system 104 may be configured to communicate the information at particular time intervals. The maintenance system 104 may be configured to communicate the information based on a change in a status of one or more vehicles. Based on the availability information from the maintenance system 104, the reservation system 102 may be configured to determine a price associated with a ride request, a time associated with a ride request, etc.

The ridesharing fleet management system 100 may comprise a routing system 105. The routing system 105 may comprise one or more computing devices. For example, the devices of the routing system 105 may comprise a server or a network of servers, such as cloud computing devices. The routing system 105 may be configured to communicate with one or more other components of the ridesharing fleet management system 100, such as the reservation system 102, the maintenance system 104, and/or one or more vehicles of the fleet 101. The routing system 105 may be configured to communicate via the network 103.

The routing system 105 may be configured to determine a current location of one or more vehicles of the fleet 101. The routing system 105 may be configured to determine the current location of a vehicle based on information received from the vehicle and/or another component of the fleet management system 100. The routing system 105 may be configured to determine the current location of the vehicle based on GPS information.

The routing system 105 may be configured to determine a route for one or more rides. For example, based on a ride pickup point and/or a ride destination point, the routing system 105 may be configured to determine a fastest route and/or a shortest route from the ride pickup point to the ride destination point. The routing system 105 may be configured to determine the route based on current traffic conditions and/or road conditions (e.g., weather, construction, closures, etc.). The routing system 105 may be configured to determine the route based on a vehicle charging location and/or a vehicle parking location.

The routing system 105 may be configured to determine a route of one or more vehicles of the fleet 101 from the current location of the vehicle to a ride pickup point. The routing system 105 may be configured to determine a fastest and/or shortest route from the current location of the vehicle to the ride pickup point. The routing system 105 may be configured to determine the route based on current traffic conditions and/or road conditions.

The routing system 105 may be configured to determine a route of one or more vehicles of the fleet 101 from a destination point of a ride to a pickup point of another ride. The routing system 105 may be configured to determine a fastest and/or shortest route from the destination point of the earlier ride to the pickup point of the subsequent ride. The routing system 105 may be configured to determine the route based on current traffic conditions and/or road conditions.

The routing system 105 may be configured to determine a route of one or more vehicles of the fleet 101 from a destination point of a ride to a parking location and/or charging location. The routing system 105 may be configured to determine the fastest and/or shortest route from the destination point to the parking and/or charging location. The routing system 105 may be configured to determine the route based on current traffic conditions and/or road conditions.

The routing system 105 may be configured to determine a route for a ride based on other rides. For example, if the ride request comprises a request for a shared ride. The routing system 105 may be configured to determine other requested shared rides proximate to the ride. The routing system 105 may be configured to determine a route that will pass through one or more pickup points of the shared rides and/or one or more destination points of the shared rides.

The routing system 105 may be configured to determine how to deploy vehicles of the fleet 101 to optimize routes. Optimizing routes may comprise minimizing time that vehicles are not moving, minimizing time that vehicles are parked, minimizing distances that vehicles travel (e.g., distances that vehicle travel when not carrying a passenger or payload), minimizing time that vehicles are traveling between routes, minimizing time that passengers wait to be picked up, and/or minimizing time of rides. For example, the routing system 105 may be configured to match two ride requests based on a destination point of one of the requested rides being close to a pickup point of the other requested ride. The routing system 105 may be configured to determine that a same vehicle should provide both rides. The routing system 105 may be configured to communicate routing information to one or more of the vehicles. The vehicles may be configured to follow the routes determined by the routing system 105.

The ridesharing fleet management system 100 may comprise a coordination system 106. The coordination system 106 may comprise one or more computing devices. For example, the coordination system 106 devices may comprise a server or a network of servers, such as cloud computing devices. The coordination system 106 may be configured to communicate with one or more other components of the ridesharing fleet management system 100, such as the reservation system 102, the maintenance system 104, the routing system 105, and/or one or more vehicles of the fleet 101. The coordination system 106 may be configured to communicate via the network 103.

The coordination system 106 may be configured to determine a price of one or more rides. The price may be determined based on a length of the a route of a requested ride. The price may be determined based on a distance between a destination point of a requested ride and a pickup point of another requested ride (e.g., by a different user). The price may be determined based on a requested ride having an estimated drop-off time at a similar time as a requested pickup time of another requested ride. The price may be determined based on a distance between the destination of a requested ride and other locations of interest. For example, requested rides with destinations in remote locations may have higher prices than requested rides with destinations near populated areas where subsequent passengers are likely to be located. The coordination system 106 may be configured to communicate the determine prices to the reservation system 102. The reservation system 102 may be configured to present the determined prices to users via the applications running on the user devices.

The coordination system 106 may be configured to determine priorities of ride requests. The coordination system 106 may be configured to determine which rides would maximize profits. The coordination system 106 may be configured to assign a higher priority to ride requests that result in more profit and a lower priority to rides that are less profitable. For example, if a bidding system is employed, the coordination system may communicate with the reservation system 102 to determine bids of ride requests. The ride requests with higher bids may be determined to be more profitable.

The coordination system 106 may be configured to determine the priorities of the rides based on ratings of users. The coordination system 106 may be configured to determine user ratings based on frequency of riding services used by the user, punctuality of the user (e.g., time in arriving to a pickup spot and/or in exiting a vehicle), rider behavior of the user (e.g., causing damage to a vehicle and/or bothering a shared ride co-passenger) and/or other factors. Rides requested by users with higher ratings may be assigned higher priorities than rides requested by users with lower ratings.

If there is a limited number of vehicles available, the vehicles may be assigned to the requested rides in order of priority. Lower priority ride requests may be denied, charged a higher price, and/or be quoted a higher estimated weight time for vehicle arrival. Lower priority ride requests may be added to a queue. The ride requests may be accepted and/or fulfilled in order of the queue.

The coordination system 106 may be configured to determine parking locations for one or more vehicles of the fleet 101. The coordination system 106 may be configured to determine parking locations for a vehicle between rides. For example, the coordination system 106 may be configured to determine a nearest parking lot to a destination point of a ride route. The coordination system 106 may be configured to communicate the parking lot to the vehicle. The vehicle may go to the determined parking lot until a further command is received. The coordination system 106 may be configured to determine a parking location that is near a populated area or an area likely to be near a pickup point of a next ride route. The area likely to be near a pickup point of a next ride route may be determined based on historical data, such as past rides and/or ride requests at similar or the same times and/or days.

The coordination system 106 may be configured to determine a charging location of one or more vehicles of the fleet 101. The vehicle may be configured to charge on a pads, a dock, a magnetic connection, and/or remotely, as examples. The coordination system 106 may be configured to determine a nearest charging location to a vehicle and communicate the charging location to the vehicle. The coordination system 106 may be configured to determine a nearest charging location to a destination point of a ride route and/or a nearest charging location to a ride pickup point, as examples.

Although the components of the ridesharing fleet management system 100 may comprise distinct devices, one or more of the components may comprise a same device. As a non-limiting example, a server may comprise a reservation system 102 device and a routing system 105 device. One or more of the components of the ridesharing fleet management system 100 may perform one or more of the same operations. As a non-limiting example, both the reservation system 102 and the maintenance system 104 may be configured to determine which vehicle should provide a requested ride.

However, dividing the operations amongst the various components of the ridesharing fleet management system may have several technical advantages over a centralized system. For example, the system 100 may be less vulnerable to hacking. The system 100 may be less vulnerable or less affected by crashes of one or more components. The system 100 may have less latency. The system 100 may provide services with more granularity and/or handle more complex ride request.

Figure 2:
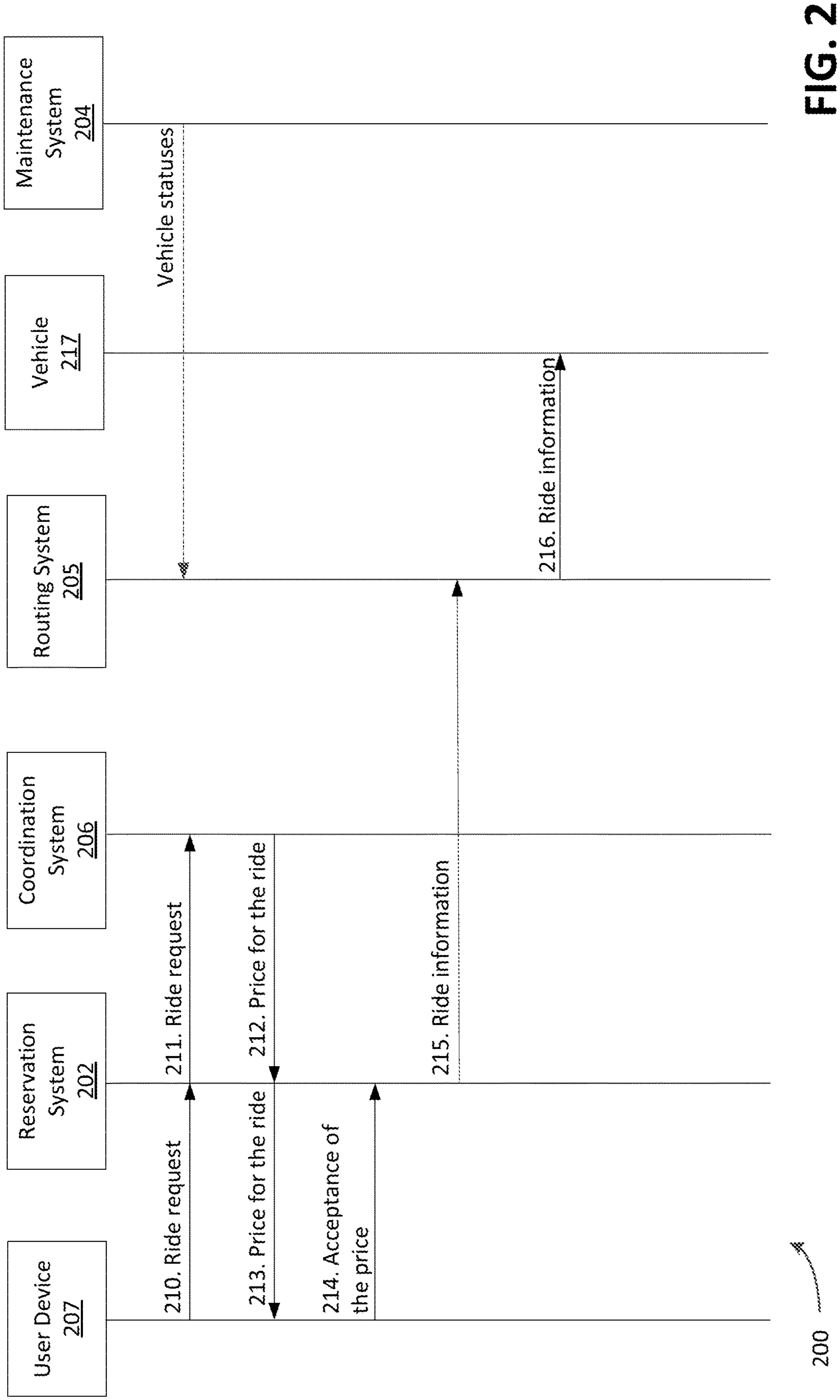
FIG. 2 shows an example ridesharing fleet management method.

FIG. 2 shows an example ridesharing fleet management method 200. The method may be performed by one or more components of a ridesharing fleet management system (e.g., ridesharing fleet management system 100 in FIG. 1). The ridesharing fleet management system may comprise a reservation system 202 (e.g., reservation system 102 in FIG. 1). The reservation system 202 may be in communication with a user device 207. The user device 207 may comprise a phone, a laptop, a tablet, and/or a desktop, as examples. The reservation system 202 may communicate with the user device 207 via an application running on the user device 207.

At step 210, the reservation system 202 may receive a request for a ride from the user device 207. The reservation system 202 may receive the request for the ride via the application running on the user device 207. The request for the ride may comprise an indication a pickup point, one or more intermediary stopping points, and/or one or more destination points. The request may comprise an indication of a desired pickup time. The requests may comprise an indication of a desired arrival time.

At step 211, the reservation system 202 may send an indication of the ride request to a coordination system 206 (e.g., coordination system 106 in FIG. 1) of the ridesharing fleet management system. Based on receiving the indication of the ride request, the coordination system 206 may determine a price for the requested ride. The coordination system 206 may determine the price based on a temporal and/or physical length of the requested ride. The coordination system 206 may determine the price based on a distance between a route destination and a pickup point of another route requested by another user for a ride starting at a similar time as an estimated arrival of the first route. The coordination system 206 may determine the price based on a distance between the route destination and other locations of interest. The coordination system 206 may determine the price based on a time of the ride request. The coordination system 206 may determine the price based on historical data associated with numbers of ride requests received at certain times of day or on certain days of the week. The coordination system 206 may determine the price based on a number of vehicles available at the requested time. The coordination system 206 may determine the price based on a number of other users requesting rides, such as a number of users in a vicinity of the requesting user, who are also requesting rides at the time. The coordination system 206 may determine the price based on a current fuel or electricity price. The coordination system 206 may determine the price based on a bidding process.

At step 212, the coordination system 206 may send an indication of the determined price to the reservation system 202. At step 213, the reservation system 202 may send an indication of the determined price to the user device 207, such as via the application running on the user device 207.

At step 214, the reservation system 202 may receive an indication of an acceptance and/or confirmation of the ride from the user device 207, such as via the application. At step 215, based on receiving the indication of the acceptance and/or confirmation of the ride, the reservation system 202 may send an indication of the ride to a routing system 205 of the ridesharing fleet management system.

Based on receiving the indication of the ride, the routing system 205 and/or a maintenance system 204 of the ridesharing fleet management system may determine a vehicle 217 to service the ride. The vehicle 217 may comprise an AV. The vehicle 217 may be determined based on a current location of a vehicle and a distance from the current location to a location of a user and/or a populated area. The vehicle 217 may be determined based on it having an available status. The routing system 205 may determine that the vehicle 217 has an available status based on information received from a maintenance system 204 (e.g., maintenance system 104 of FIG. 1) of the ridesharing fleet management system. The routing system 205 may request an update of the vehicle statuses from the maintenance system 204 in response to a request for the vehicle statuses sent to the maintenance system 204 from the routing system 205. The routing system may send the request for the statuses based on receiving the indication of the ride. The routing system 205 may request the statuses of the vehicles and/or the maintenance system 204 may provide the statuses of the vehicles periodically (e.g., every minute, half hour, hour, etc.). The routing system 205 may request the statuses of the vehicles and/or the maintenance system 204 may provide the statuses of the vehicles before, after, or during any one or more steps of the method 200. The routing system 205 may determine the vehicle 217 based on it having an available status. If the maintenance system 204 determined the vehicle 217, the maintenance system 204 may send the routing system 205 an indication of the determined vehicle 217.

The routing system 205 may determine a route for the determined vehicle 217. The routing system 205 may determine the route based on the pickup point, the destination point, the pickup time, and/or the arrival time of the requested ride. The routing system 205 may determine a fastest route and/or a shortest route from the ride pickup point to the ride destination point. The routing system 205 may be determine the route based on current traffic conditions and/or road conditions (e.g., weather, construction, closures, etc.). The routing system 205 may determine the route based on a charging location and/or a parking location.

The routing system 205 may determine the route based on other rides. For example, if the ride request comprises a request for a shared ride. The routing system 205 may determine other requested shared rides proximate to the ride. The routing system 205 may determine a route that will pass through one or more pickup points of the shared rides and/or one or more destination points of the shared rides.

At step 216, the routing system 205 may communicate with the determined vehicle 217. The routing system 205 may send the vehicle 217 an indication of the pickup point and/or the destination point of the ride. The routing system 205 may send the vehicle 217 an indication of the determined route for the ride. The routing system 205 may send the vehicle an indication of the pickup time and/or the arrival time associated of the ride.

Based on receiving the information from the routing system 205, the vehicle 217 may save the information. The vehicle 217 may save the information to a memory of a navigation system and/or a telematics unit of the vehicle 217. The vehicle 217 may process the information received from the routing system 205. The vehicle 217 may determine a route for the ride, such as based on the pickup point, the destination point, a fastest route, a shortest route, traffic conditions, and/or weather conditions. The vehicle 217 may drive to the pickup point and/or along the determined route.

Figure 3:
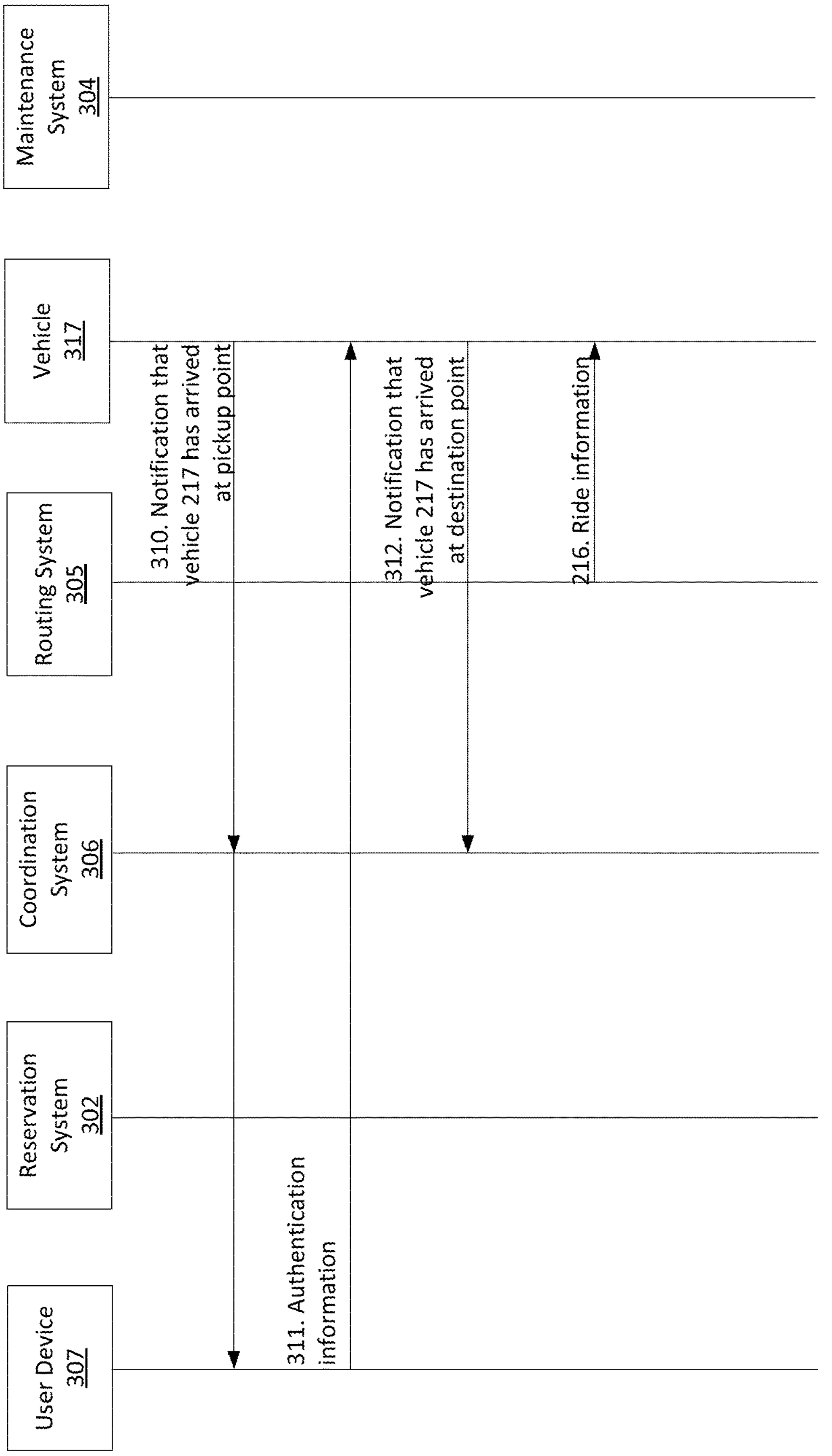
FIG. 3 shows an example ridesharing fleet management method.

FIG. 3 shows an example ridesharing fleet management method 300. The method 300 may be performed after the method 200 in FIG. 2. At step 310, a notification may be sent to a user device 307 indicating that a vehicle 317 has arrived at a ride pickup point. The vehicle 317 may comprise an AV. The notification may be sent to the user device 307 by the vehicle 317. The notification may be sent to the user device 307 by one or more components of a ridesharing fleet management system (e.g., ridesharing fleet management system 100 in FIG. 1). For example, the notification may be sent to the user device 307 by a reservation system 302 (e.g., reservation system 102 in FIG. 1) of the ridesharing fleet management system. The notification may be sent to the user device 307 via an application running on the user device 307.

The notification may indicate a current location of the vehicle. For example, the notification may indicate GPS coordinates of the current location of the vehicle. The notification may indicate a street or an intersection near the current location of the vehicle. The notification may comprise a graphic representation of the current location of the vehicle, such as via a graphic user interface of the application running on the user device 307.

The vehicle 317 and/or another component of the ridesharing fleet management system may determine an elapsed time from a time of the sending of the notification to a time of a passenger arriving at the vehicle 317. The vehicle 317 may determine that the passenger has arrived at the vehicle 317 based on the passenger opening the vehicle (e.g., a door, a trunk, etc. of the vehicle). The vehicle 317 may determine that the passenger has arrived at the vehicle 317 based on the passenger initiating an authentication process. The vehicle 317 may determine that the passenger has arrived at the vehicle 317 based on receiving a notification from the user device 307.

The vehicle 317 and/or another component of the ridesharing fleet management system may determine if the elapsed time meets and/or exceeds a threshold time. The threshold time may be determined based on one or more factors. For example, the threshold time may be adjusted to give the user adequate time to reach the vehicle. However, the user may be penalized for delaying in arriving at the vehicle or for failing to arrive for the ride. For example, the threshold time may be determined based on a distance between a location of the user device 307 at the time of a ride request and the pickup location of the vehicle 317. The threshold time may be determined based on an elapsed time between a time of receiving the ride request and a time of the vehicle arriving at the pickup point.

A component of the ridesharing fleet management system, such as a coordination system 306 (e.g., coordination system 106 in FIG. 1), may determine the threshold time based on other ride requests. For example, at a peak ride time when vehicles are in high demand, the coordination system 306 may determine a shorter threshold time than at an off-peak ride time. The coordination system 306 may determine the threshold time based on a number of available vehicles. The number of available vehicles may be received and/or determined by a maintenance system 304.

Based on the elapsed time meeting and/or exceeding the threshold time, the vehicle 317 may leave the pickup location. For example, the vehicle 317 may return to a parking location or may go to a pickup location of another ride. Based on the elapsed time meeting and/or exceeding the threshold time, a notification may be sent to the user device 307, such as via the application. Based on the elapsed time meeting and/or exceeding the threshold time, the price of the ride may be adjusted. For example, the coordination system 306 may determine to adjust the price. Based on the elapsed time meeting and/or exceeding the threshold time, the price of the ride may be increased.

At step 311, a passenger may be authenticated. The passenger may be authenticated to determine that the passenger attempting to access the vehicle 317 is the user who requested the ride and/or the passenger for whom the ride was requested. The vehicle 317 and/or another component of the ridesharing fleet management system may authenticate the passenger. The passenger may be authenticated based on communicating with the user device 307, such as via the application. For example, authentication data, such as a code or a token, may be received from the user device 307. The vehicle 317 and/or another component of the ridesharing fleet management system may receive the authentication data from the user device 307 via Wi-Fi, Bluetooth, radio frequency (RF), near field communication (NFC), and/or another communication protocol.

The vehicle 317 may authenticate the user by receiving authentication data via an input device installed on the vehicle 317, such as a keypad, a combination lock, or a touchscreen. The input device may be installed on an exterior of the vehicle 317, such as on or near a door of the vehicle 317. The vehicle 317 may authenticate the passenger and/or user by receiving authentication data, such as a barcode and/or a QR code, via a reader device installed on the vehicle 317. The vehicle 317 may authenticate the passenger by receiving biometric authentication data, such as a retinal scans, face recognition, a fingerprint scan, or voice recognition, via a camera, scanner, or other scanning device installed on the vehicle 317. The scanning device may be installed on the exterior of the vehicle 317, such as on or near a door of the vehicle 317.

The passenger may be authenticated by determining that received authentication information matches known authentication information. The known authentication information may comprise information associated with a user that requested the ride, such as with an account of the user for the application. The known information may be generated based on the user device 307 downloading and/or installing the application. The known information may be generated based an account for the user being created. The known information may be requested and/or received based on the user device 307 downloading and/or installing the application. For example, if the authentication information comprises a username and/or password, the user may create the username and/or password when the application is installed on the device. The user may enter the username and/or password in the application and the user device 307 may send the username and/or password to a component of the ridesharing fleet management system, such as a reservation system 302 (e.g., reservation system 102 in FIG. 1). The authentication information may be stored to a database of authentication information, such as on the reservation system 302.

If the authentication information comprises biometric information, the biometric information may be requested and/or collected, such as via a camera and/or input of the user device 307, based on the user device 307 downloading the application and/or based on a user account being created. The biometric information may be stored to the database of authentication information.

The known authentication information may comprise information associated with the ride. For example, based on receiving a ride request or a confirmation of a ride from the user device 307, the known authentication information may be generated. Based on receiving a ride request or a confirmation of a ride from the user device 307, the known authentication information may be sent to the user device 307.

Based on the passenger and/or user being authenticated, the vehicle 317 may enable the passenger to access the vehicle. For example, the vehicle 317 may unlock one or more doors of the vehicle 317. Based on the passenger being authenticated, the vehicle 317 may start its engine. Based on the passenger being authenticated, the vehicle 317 may start driving on the ride route.

The vehicle 317 may arrive at the destination point of the ride. Based on arriving at the destination point, the vehicle 317 may come to a stop. The vehicle 317 may stop next to a sidewalk or in a location where it is safe for the passenger to exit. Based on arriving at the destination point and/or stopping, the vehicle 317 may determine that the passenger and/or a payload has exited and/or been removed from the vehicle 317. Based on determining that the passenger and/or payload has exited and/or been removed from the vehicle 317, the vehicle may leave the destination point. Based on determining that the passenger and/or payload has not exited and/or been removed from the vehicle 317, the vehicle may not leave its current location. The vehicle 317 may not leave it current location until it is determined that the passenger and/or payload has exited and/or been removed from the vehicle 317.

The vehicle 317 and/or another component of the ridesharing fleet management system may determine an elapsed time from a time of the vehicle 317 arriving at the destination points and/or stopping and a time of the passenger and/or payload exiting and/or being removed from the vehicle 317. The vehicle 317 and/or another component of the ridesharing fleet management system may determine if the elapsed time meets and/or exceeds a threshold time. The threshold time may be determined based on one or more factors. For example, the threshold time may be adjusted to give the passenger adequate time to exit the vehicle and/or remove their personal effects from the vehicle 317. However, the passenger may be penalized for delaying in exiting the vehicle.

A component of the ridesharing fleet management system, such as the coordination system 306, may determine the threshold time based on other ride requests. For example, at a peak ride time when vehicles are in high demand, the coordination system 306 may determine a shorter threshold time than at an off-peak ride time. The coordination system 306 may determine the threshold time based on a number of available vehicles. The number of available vehicles may be received and/or determined by a maintenance system 304.

Based on the elapsed time meeting and/or exceeding the threshold time, the price of the ride may be adjusted. For example, the coordination system 306 may determine to adjust the price. Based on the elapsed time meeting and/or exceeding the threshold time, the price of the ride may be increased.

Based on the elapsed time meeting and/or exceeding the threshold time, a notification may be sent to the user device 307, such as via the application. Based on the elapsed time meeting and/or exceeding the threshold time, a notification may be output via an output device of the vehicle, such as a display or a speaker. Based on the elapsed time meeting and/or exceeding the threshold time, a notification may be sent to a computing device associated with the ridesharing fleet management system, a central operator, an emergency service provider, a health provider, and/or a contact of the passenger and/or user, as examples. Based on an elapsed time after a time of sending a notification to the user device 307 and/or outputting the notification, a notification may be sent to a computing device associated with the ridesharing fleet management system, a central operator, an emergency service provider, a health provider, and/or a contact of the passenger and/or user, as examples.

At step 312, the vehicle 317 may send a notification of a completion of the ride to one or more components of the ridesharing fleet management system. The vehicle 317 may send the notification based on the vehicle 317 arriving at the ride destination point. The vehicle 317 may send the notification based on the vehicle 317 coming to a stop. The vehicle 317 may send the notification based on a determination that a passenger and/or payload has exited and/or been removed from the vehicle.

Based on receiving an indication that the vehicle 317 completed the ride, the coordination system 306 may determine a price associated with the ride. The price may be determined based on an estimated price sent to the user device 307, such as before the ride. The price sent to the user device 307 may comprise a base price. Changes to the base price may be made, such as based on damage to the vehicle 317. The price may be adjusted from the base price based on the passenger delaying in arriving to the pickup point of the ride. The price may be adjusted based on the elapsed time of the sending the notification of the arrival of the vehicle 317 to the passenger arriving at the vehicle 317 meeting and/or exceeding the threshold time. The price may be adjusted from the base price based on the passenger delaying in exiting the vehicle 317.

At step 218, an indication of the determined price may be sent to the user device 207. A payment for the ride may be processed, such as using payment information saved to the user device (e.g., on the application).

A user rating for the passenger may be determined based on the ride. The rating may be determined by a component of the ridesharing fleet management system, such as the coordination system 306. The user rating may be determined based on a number of rides that the passenger took in a period of time (e.g., a day, a week, a month, a year, etc.) including the completed ride. The user rating may be determined based on the elapsed time of the sending the notification of the arrival of the vehicle 317 to the passenger arriving at the vehicle 317 meeting and/or exceeding the threshold time. The user rating may be determined based on the passenger delaying in exiting the vehicle 317. The user rating may be determined based on damage to the vehicle 317.

Based on the user rating, an account associated with the passenger and/or the user who requested the ride may be offered special deals. Based on the user rating, ride requests from the account associated with the passenger and/or the requesting user may be given priority to other ride requests. For example, if there are more requested rides than there are available vehicles to service the rides, ride requests from users with higher ratings may be accepted and ride request from users with lower ratings may be denied. Ride requests from users with higher ratings may be accepted and/or provided with a vehicle before ride requests from users with lower ratings.

FIG. 4 shows an example ridesharing fleet management method 400. The method 400 may be performed by a ridesharing fleet management system (e.g., ridesharing fleet management system 100 in FIG. 1). At step 410, a request for a ride may be received. The request may be received from a user device (e.g., user device 207 in FIG. 2, user device 307 in FIG. 3). The request may be received via an application running on the user device. The request may be received by one or more components of the ridesharing fleet management system. For example, the request may be received by a reservation system (e.g., reservation system 202 in FIG. 2, reservation system 302 in FIG. 3) of the ridesharing fleet management system.

At step 411, a price may be determined for the requested ride. The price may be determined based on the receiving the request for the ride. The price may be determined by one or more components of the ridesharing fleet management system. For example, the price may be determined by the reservation system of the ridesharing fleet management system. The price may be determined by a routing system (e.g., routing system 205 in FIG. 2, routing system 305 in FIG. 3) of the ridesharing fleet management system. The price may be determined on one or more of the described factors. For example, the price may be determined based on availability statuses of one or more vehicles, a number of ride requests received, a location of one or more vehicles, a starting point of the requested ride, a destination point of the requested ride, a rating of a passenger and/or user, and/or a bidding system, historical data, fuel and/or electricity prices, etc.

At step 412, the determined price for the requested ride may be sent. The determined price may be sent to the user device. The determined price may be sent via the application running on the user device. The determined price may be sent by one or more components of the ridesharing fleet management system, such as the reservation system and/or the routing system.

At step 413, an acceptance of the determined price for the requested ride may be received. The acceptance of the determined price may be received from the user device. The acceptance of the determined price may be received via the application running on the user device. The acceptance of the determined price may be received by one or more components of the ridesharing fleet management system, such as the reservation system and/or the routing system.

Based on receiving the acceptance of the determined price for the requested ride, the component of the premises management system may send an indication of the acceptance of the determined price and/or other data associated with the requested ride to another component of the ridesharing management system. For example, the data associated with the ride may be sent to a routing system (e.g., routing system 205 in FIG. 2, routing system 305 in FIG. 3) of the ridesharing fleet management system.

At step 414, a vehicle of a fleet of vehicles of the ridesharing fleet management system may be determined to provide the ride. The vehicle may be determined based on receiving the acceptance of the determined price. The vehicle may be determined by one or more components of the ridesharing fleet management system. For example, the vehicle may be determined by the routing system of the ridesharing fleet management system. The vehicle may be determined based on a current location of the vehicle, a current maintenance status of the vehicle, a current availability status of the vehicle, etc.

Based on determining the vehicle, information may be sent to the vehicle. For example, data associated with the requested ride may be sent to the vehicle. The information may be sent to the vehicle by the component of the ridesharing fleet management system that determined the vehicle.

Based on determining the vehicle, an indication that the vehicle was determined may be sent to a component of the ridesharing fleet management system. For example, the indication that the vehicle was determined may be sent to the coordination system and/or the maintenance system. Based on the indication that the vehicle was determined, a status of the determined vehicle may be updated. For example, the status of the vehicle may be changed from “available” to “unavailable.” The status of the vehicle may be updated at least for a period of time associated with the requested ride.

At step 415, a route associated with the requested ride may be determined. The route may be determined based on receiving the acceptance of the determined price. The route may be determined based on determining the vehicle to provide the requested ride. The route may be determined based on receiving information associated with the requested ride, such as from one or more components of the ridesharing fleet management system. The route may be determined by one or more components of the ridesharing fleet management system, such as the routing system. The route may be determined based on one or more of the described factors. For example, the route may be determined based on a pickup point of the requested ride, a destination point of the requested ride, a current location of the determined vehicle, a pickup point of a subsequent and/or shared ride, a destination point of a subsequent and/or shared ride, a vehicle charging location, a vehicle parking location, a weather condition, and/or a road condition, etc.

At step 416, the determined vehicle may be caused to provide the requested ride. The vehicle may be caused to provide the requested ride along the determined route. The determined vehicle may be caused to provide the requested ride based on determining the route. The determined vehicle may be caused to provide the requested ride may be based on the determining the vehicle. The determined vehicle may be caused to provide the requested ride based on receiving the acceptance of the determined price.

The vehicle may be caused to provide the requested ride by one or more components of the ridesharing fleet management system. For example, the vehicle may be caused to provide the requested ride by the reservation system, the coordination system, the routing system, and/or the maintenance system of the ridesharing fleet management system. Causing the vehicle to provide the requested ride may comprise causing the vehicle to go to the pickup point. Causing the vehicle to provide the requested ride may comprise sending the vehicle an indication of the determined route.

Figure 5:
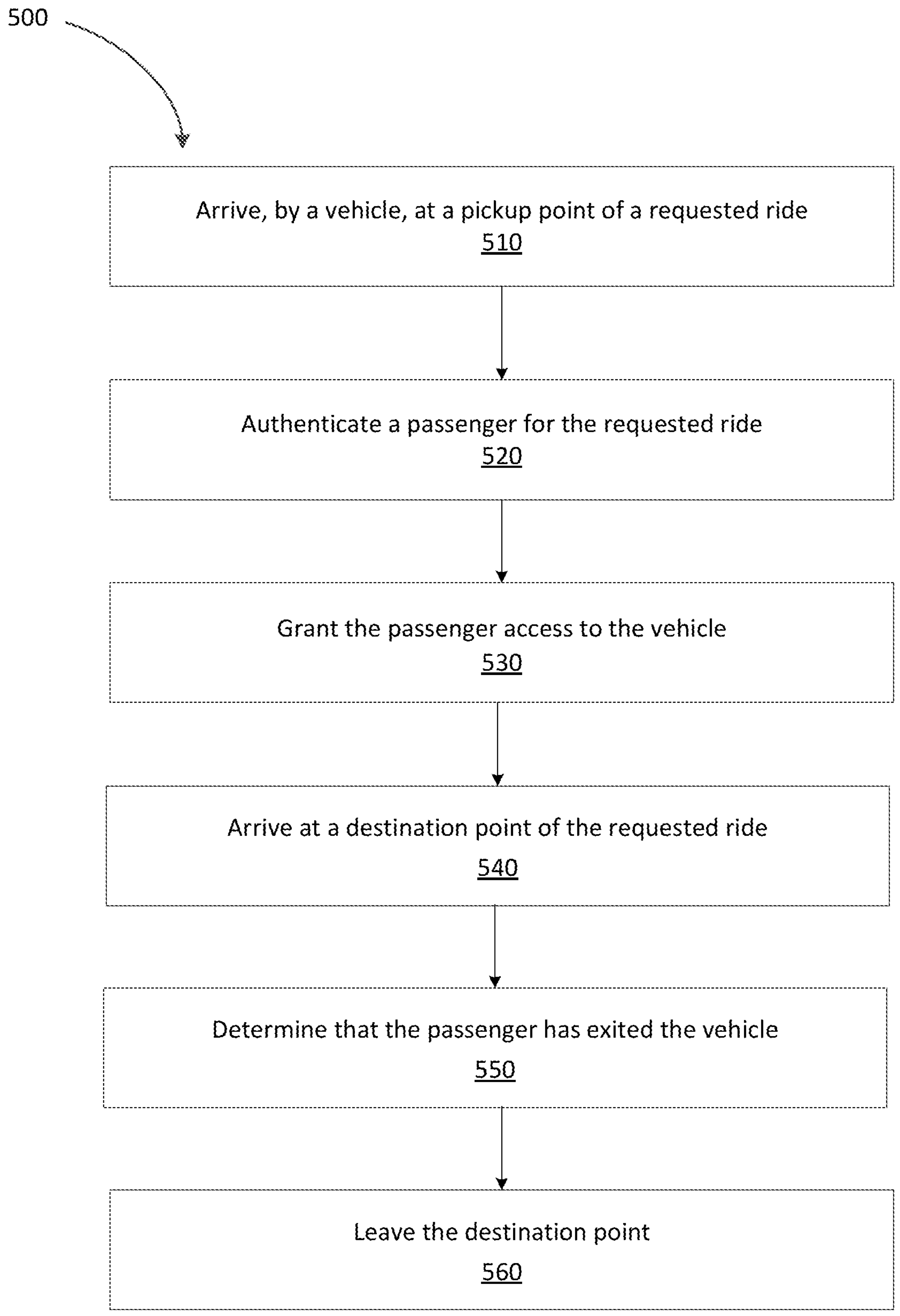
FIG. 5 shows an example ridesharing fleet management method.

FIG. 5 shows an example ridesharing fleet management method 500. At step 510, a vehicle of a ridesharing fleet (e.g., fleet 101 in FIG. 1) may arrive a pickup point for a requested ride. The vehicle may go to the pickup point based on receiving an indication of the pickup point, such as from a component of a ridesharing fleet management system (e.g., ridesharing fleet management system 100 in FIG. 1), such as a routing system (e.g., routing system 105 in FIG. 1, routing system 205 in FIG. 2, routing system 305 in FIG. 3) of the ridesharing fleet management system. The pickup point may comprise a location received from a user, such as via a user device and/or via an application running on a user device. For example, a component of the ridesharing fleet management system may receive a ride request comprising the pickup point from the user device. The component may send the indication of the pickup point to the vehicle. Based on receiving the indication of the pickup point, the vehicle may navigate to the pickup point. The vehicle may navigate to the pickup point using a telematics unit and/or an on-board navigation system of the vehicle.

Based on arriving at the pickup point, the vehicle may send a notification. The vehicle may send the notification to the user device. The vehicle may send the notification to a component of the ridesharing fleet management system, such as the routing system. The component of the ridesharing fleet management system may send a notification to the user device based on receiving the notification from the vehicle. The notification from the vehicle and/or the other component of the ridesharing fleet management system may indicate that the vehicle has arrived at the pickup point.

At step 520, the vehicle may authenticate a passenger and/or user for the requested ride. The vehicle may authenticate the passenger based on arriving at the pickup point. Authenticating the passenger may comprise determining that the passenger is the one who requested the ride and/or for whom the ride is designated. The vehicle may authenticate the passenger before giving the passenger access to the vehicle (e.g., unlocking one or more doors of the vehicle). The vehicle may authenticate the passenger based on receiving a communication, such as a request for authentication. The vehicle may receive the communication from the user device and/or another component of the ridesharing fleet management system.

Authenticating the vehicle may comprise communicating with the user device, such as via the application running on the user device. For example, authenticating the passenger may comprise the vehicle receiving authentication data, such as a code and/or a token, from the user device. The vehicle may receive the authentication data via an input installed on the vehicle, such as a keypad, a combination lock, and/or a touchscreen. The input may be installed on an exterior of the vehicle, such as on or near a door of the vehicle. If the authentication data comprises a barcode and/or a QR code, the vehicle may receive the authentication data via a reader installed on the vehicle. If the authentication data comprises biometric authentication data, such as a retinal scan and/or a fingerprint scan, the vehicle may receive the authentication data using facial recognition technology and/or voice recognition technology, as examples. The vehicle may receive biometric authentication data using a camera, scanner, sensor, and/or other device installed on the vehicle. The authentication device may be installed on the exterior of the vehicle, such as on or near a door of the vehicle. Alternatively and/or additionally, another component of the ridesharing management system may receive the authentication data, such as from the user device, and/or sent the authentication data to the vehicle.

Authenticating the passenger may comprise determining whether the received and/or determined authentication data matches stored and/or known authentication data associated with a requester of the ride. Based on determining that the received and/or determined authentication data matches the stored and/or known authentication data, the vehicle may determine that the passenger is authenticated.

At step 530, the vehicle may grant the passenger access to the vehicle. The vehicle may grant the passenger access to the vehicle based on authenticating the passenger. The vehicle may grant the passenger access to the vehicle by causing one or more doors of the vehicle to unlock. The vehicle may grant the passenger access to the vehicle by unlocking a steering wheel or an engine of the vehicle.

The vehicle may depart from the pickup point based on a determination that the passenger has entered the vehicle. The vehicle may determine that the passenger has entered the vehicle based on determining a change in a payload in the vehicle. The telematics unit of the vehicle may determine that the change in payload. For example, the telematics unit may comprise and/or be configured to communicate with a scale (e.g., a weight sensor). The scale may be calibrated to "0" before the vehicle arrives at the pickup point, before access to the vehicle is granted to the passenger, and/or before the vehicle is accessed (e.g., opened, occupied) by the passenger. A reading of the scale before the vehicle is deployed and/or accessed by a passenger may be recorded. A reading of the scale when the vehicle is deployed, after the vehicle is deployed, when the vehicle arrives at the pickup point, when the vehicle is accessed, and/or after the vehicle is accessed may be recorded. The readings from different times may be compared. An increase in the scale measurements may indicate that a payload has entered the vehicle. A decrease in the scale measurements may indicate that the payload has exited and/or been removed from the vehicle.

The telematics unit may determine the change in payload by generating a heatmap of an interior of the vehicle, such as using one or more cameras installed in the vehicle. A heatmap may be generated based on one or more particular events. A heatmap may be generated before the vehicle is deployed, when the vehicle is deployed, after the vehicle is deployed, when the vehicle arrives at the pickup point, before the vehicle is accessed, when the vehicle is accessed, and/or after the vehicle is accessed. Heatmaps may be generated continuously, at time intervals, and/or based on reaching segments of routes (e.g., a pickup point, a beginning of a route, a first quarter of a route, a half-way point of a route, a three-quarters point of a route, a route destination, etc.). The heatmaps generated at different times may exhibit different characteristics based on the entry, removal, and/or exit of a payload.

The heatmaps may be compared. Differences in the heatmaps may be determined. The determined differences in the heatmaps may be used to determine changes in payloads. For example, based on a first heat map generated in the vehicle at a time X showing less heat than a second heat map generated at a time Y, where Y is a later time than X, it may be determined that a payload has entered the vehicle. Based on a first heat map generated in a vehicle at a time X showing more heat than a second heat map generated at a time Y, where Y is a later time than X, it may be determined that a payload has exited and/or been removed from the vehicle.

The vehicle may depart from the pickup point based on a determination that the vehicle is secure. The vehicle may determine that the vehicle is secure based on one or more doors (e.g., passenger compartment doors, storage compartment doors, etc.) being closed and/or locked. The vehicle may determine that the vehicle is secure based on one or more seatbelts being fastened.

At step 540, the vehicle may arrive at a destination point. The destination point may comprise a destination of the requested ride. If the ride is a shared ride, the destination may not be a requested destination associated with the ride, but a destination or a pickup point of another ride. The vehicle may travel from the pickup point to the destination point along a determined route. The route may be determined by a navigation system of the vehicle. The route may be determined by a routing system (e.g., routing system 105 in FIG. 1, routing system 205 in FIG. 2, routing system 305 in FIG. 3) of the fleet management system and/or another component of the ridesharing fleet management system. The route may be received by the vehicle from the routing system and/or the other component of the ridesharing fleet management system. The determined route may comprise a shortest and/or fastest route from the pickup point to the destination point. The route may be determined based on weather, traffic, and/or road conditions.

The vehicle may come to a stop at a location near the destination point of the ride that is designated for parking. The vehicle may come to a stop at a location near the destination point of the ride that is safe for passenger exit, such as near a sidewalk or out of a traffic lane.

At step 550, the vehicle may determine that the passenger has exited the vehicle. The vehicle may determine that other payloads, such as pets, luggage, cargo, or other personal items, have been removed from the vehicle. The vehicle may determine that the passenger has exited the vehicle and/or that payloads have been removed from the vehicle based on arriving at the destination point of the ride. Determining that the passenger has exited the vehicle and/or that payloads have been removed from the vehicle may comprise determining a change in payload of the vehicle. Determining that the passenger has exited the vehicle may comprise receiving a notification from the user device, such as a confirmation that the passenger and all personal effects have been removed from the vehicle. Determining that the passenger has exited the vehicle may comprise determining that a seatbelt has been unfastened. Determining that the passenger has exited the vehicle may comprise determining that one or more doors of the vehicle have been shut.

If the ride is a shared ride or a ride having multiple destination points, the vehicle may determine that a payload associated with the ride associated with the destination point has been removed and/or exited from the vehicle. For example, the vehicle may determine that a payload associated with passenger A is X pounds and a payload associated with passenger B is Y pounds. X and Y may each be any number. The vehicle may arrive at a destination point associated with passenger A. The vehicle may determine that the net payload in the vehicle has decreased by X pounds, such as based on arriving at the destination point associated with passenger A and/or before leaving the destination point associated with passenger A. The vehicle may arrive at a destination point associated with passenger B. The vehicle may determine that the net payload in the vehicle has decreased by Y pounds, such as based on arriving at the destination point associated with passenger B and/or before leaving the destination point associated with passenger B.

Based on determining that the payload has not exited and/or been removed from the vehicle, the vehicle may not leave the destination point. Based on determining that the payload has not exited and/or been removed from the vehicle, the vehicle may output a notification. The notification may comprise an audible notification. The notification may comprise a visual notification, such as a flashing light. The notification may wake up the passenger and/or inform the passenger that the vehicle has arrived at the route destination.

The vehicle may determine a time that has elapsed after output of the notification. As a result of the elapsed time reaching a threshold time and the passenger having still not exited the vehicle (e.g., as a result of the passenger being unconscious or incapacitated), the vehicle may send a notification to a computing device associated with the ridesharing fleet management system, another component of the ridesharing fleet management system, a central operator, an emergency service provider, a health provider, and/or a contact of the passenger and/or user, as examples.

At step 560, the vehicle may leave the destination point. The vehicle may leave the destination point based on determining that the passenger and/or other payloads have been removed from the vehicle. The vehicle may leave the destination point based on receiving a command from another component of the ridesharing fleet management system. The command may comprise an indication of a next destination. The next destination may comprise a pickup point of another ride. The next destination may comprise a parking location. The next destination may comprise a charging location. If the ride is a shared ride, the next destination may comprise a destination point of a ride of another passenger in the vehicle.

Figure 6:
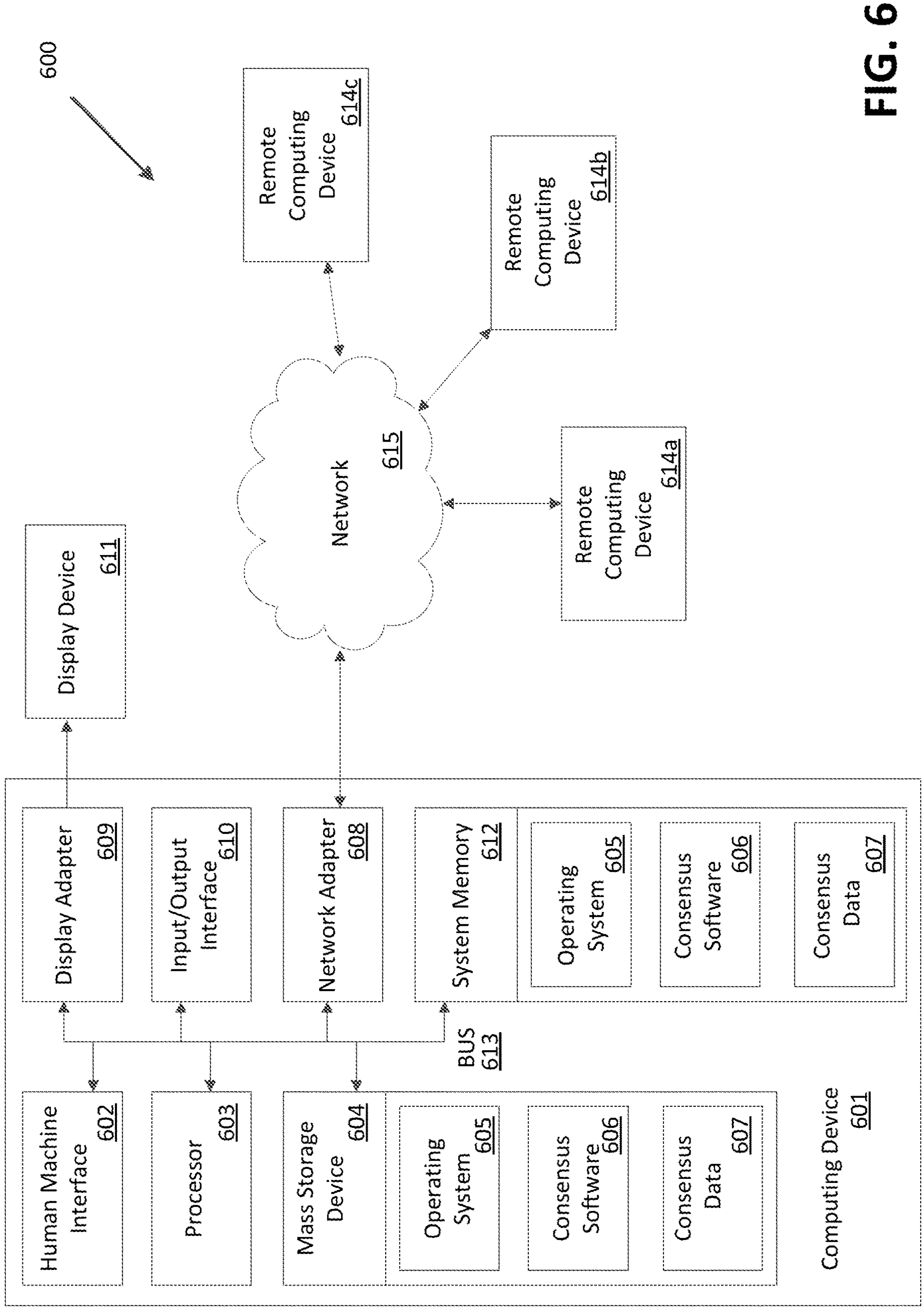
FIG. 6 shows an example computing environment.

FIG. 6 shows an example computing environment. The systems, methods, and apparatuses described herein may be implemented on a computing device such as a computing device 601 (e.g., computer) as shown in FIG. 6 and described below. Any of the components of the ridesharing fleet management system 100 in FIG. 1 may comprise a computing device as shown in FIG. 6. Similarly, the methods, systems, and apparatuses disclosed may utilize one or more computing device to perform one or more functions in one or more locations. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 601. The components of the computing device 601 may comprise, but are not limited to, one or more processors 603, a system memory 612, and a system bus 613 that couples various system components including the processor 603 to the system memory 612. With multiple processors 503, the system may utilize parallel computing.

The system bus 613 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may be implemented over a wired or wireless network connection and each of the subsystems, including the processor 603, a mass storage device 604, an operating system 605, data distillation software 506, data distillation data 607, a network adapter 608, system memory 612, an Input/Output Interface 610, a display adapter 609, a display device 611, and a human machine interface 602, may be contained within one or more remote computing devices 614*a,b,c* at physically separate locations, connected through buses of this form, in effect implementing a fully distributed system.

The computing device 601 typically comprises a variety of computer readable media. Readable media may be any available media that is accessible by the computing device 601 and comprises both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as data distillation data 607 and/or program modules such as operating system 605 and data distillation software 606 that are immediately accessible to and/or are presently operated on by the processor 603.

The computing device 601 may comprise other removable/non-removable, volatile/non-volatile computer storage media. FIG. 6 shows a mass storage device 504 which may provide non-volatile storage of computer code, computer readable instructions, data structures, program modules, and other data for the computing device 601. A mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 604, including an operating system 605 and data distillation software 606. Each of the operating system 605 and data distillation software 606 (or some combination thereof) may comprise elements of the programming and the data distillation software 606. Data distillation data 607 may be stored on the mass storage device 604. Data distillation data 607 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 601 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 603 via a human machine interface 602 that is coupled to the system bus 613, but may be connected by other interface and bus structures, such as a parallel port, game port, an IEEE 694 Port (also known as a Firewire port), a serial port, or a universal serial bus (USB).

A display device 611 may be connected to the system bus 613 via an interface, such as a display adapter 609. It is contemplated that the computing device 601 may have more than one display adapter 609 and the computing device 601 may have more than one display device 611. A display device may be a monitor, an LCD (Liquid Crystal Display), or a projector. Output peripheral devices may comprise components such as speakers (not shown) and a printer (not shown) which may be connected to the computing device 601 via Input/Output Interface 610. Any step and/or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614*a,b,c*. A remote computing device may be a personal computer, portable computer, smartphone, a server, a router, a network computer, a peer device or other common network node, and so on. Logical connections between the computing device 601 and a remote computing device 614*a,b,c* may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the data processor(s) of the computer. An implementation of data distillation software 606 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. One or more non-transitory computer-readable media storing instructions that, when executed, cause:

causing generation of a first heat map of an interior of an autonomous vehicle of a plurality of heat maps of the interior of the autonomous vehicle based on reaching a point of a route prior to a destination of the route, wherein the plurality of heat maps are different based on a presence or an absence of payload within the interior of the autonomous vehicle;

causing generation of a second heat map of the plurality of heat maps based on the autonomous vehicle reaching the destination;

determining, based on a heat comparison of the plurality of heat maps, a status of a payload in the autonomous vehicle; and instructing, based on the status of the payload, the autonomous vehicle to remain at the destination.

2. The one or more non-transitory computer-readable media of claim 1, wherein the instructions, when executed, further cause determining a price associated with a request associated with a ride associated with the autonomous vehicle based on at least one or more of an availability status of one or more vehicles in a fleet, a power level of one or more vehicles of the fleet, a distance from a current location of one or more vehicles of the fleet to a starting location, a bidding system, a rating of a user of a user device, a number of requests for rides received, a date, or a time.

3. The one or more non-transitory computer-readable media of claim 1, wherein the instructions, when executed, further cause:

determining the route from a starting location to the destination; and sending the autonomous vehicle an indication of the determined route.

4. The one or more non-transitory computer-readable media of claim 3, wherein the instructions, when executed, further cause:

determining the route based on at least one of a starting location of another ride, a destination of another ride, a vehicle charging location, a vehicle parking location, a traffic condition, or a road condition.

5. The one or more non-transitory computer-readable media of claim 1, the instructions, when executed, cause:

causing generation of a subsequent heat map of the interior of the vehicle;

comparing the subsequent heat map to one or more of the plurality of heat maps;

determining, based on a heat comparison of the subsequent heat maps and the one or more of the plurality of heat maps, an updated status of a payload in an autonomous vehicle; and removing the instruction for the autonomous vehicle to remain at the destination based on the updated status of the payload, to the autonomous vehicle.

6. The one or more non-transitory computer-readable media of claim 5, wherein removing the instruction for the autonomous vehicle to remain at the destination is based on determining that all doors of the vehicle are closed.

7. A method comprising:

causing generation of a first heat map of an interior of an autonomous vehicle of a plurality of heat maps of the interior of an autonomous vehicle based on reaching a point of a route prior to a destination of the route, wherein the plurality of heat maps are different based on a presence or an absence of payload within the interior of the autonomous vehicle;

causing generation of a second heat map of the plurality of heat maps based on the autonomous vehicle reaching the destination;

determining, based on a heat comparison of the plurality of heat maps, a status of a payload in the autonomous vehicle; and instructing, based on the status of the payload, the autonomous vehicle to remain at the destination.

8. The method of claim 7, further comprising determining the autonomous vehicle based on at least one of a power level of one or more vehicles of a fleet, an availability status of one or more vehicles of the fleet, a current location of one or more vehicles of the fleet, a pickup point of a ride, a destination of the ride, a shared ride, or a subsequent ride.

9. The method of claim 7, further comprising:

receiving a request for a ride via an application running on a user device;

receiving, via the application, an acceptance of a price associated with the ride; and causing, based on the acceptance, the autonomous vehicle to go to a starting location associated with the ride.

10. The method of claim 9, further comprising:

granting access to the autonomous vehicle based on authenticating a passenger; and determining that the passenger has entered the autonomous vehicle.

11. The method of claim 10, further comprising:

determining a weight associated with the passenger; and departing from the destination based, at least, on determining the payload of the autonomous vehicle has changed by a value substantially equal to the weight associated with the passenger.

12. The method of claim 10, further comprising, before driving to the destination driving to another pickup location associated with a requested ride.

13. The method of claim 12, wherein the driving to the destination is based at least on determining that another passenger entered the autonomous vehicle at the another pickup location.

14. The method of claim 12, further comprising driving to another destination associated with the another requested ride based on a determination that the passenger has exited the autonomous vehicle.

15. The method of claim 10, further comprising:

determining an emergency associated with a passenger of the autonomous vehicle; and based on the emergency, coming to a stop.

16. A system comprising:

a processor; and a memory coupled with the processor, the memory storing executable instructions that when executed by the processor cause the processor to effectuate operations comprising:

causing generation of a first heat map of an interior of an autonomous vehicle of a plurality of heat maps of an interior of the autonomous vehicle based on reaching a point of a route prior to a destination of the route, wherein the plurality of heat maps are different based on a presence or an absence of payload within the interior of the autonomous vehicle;

causing generation of a second heat map of the plurality of heat maps based on the autonomous vehicle reaching the destination;

determining, based on a heat comparison of the plurality of heat maps, a status of a payload in the autonomous vehicle; and instructing, based on the status of the payload, the autonomous vehicle to remain at the destination.

17. The system of claim 16, wherein the operations further comprise determining the route from a pickup location to the destination based at least on a current power level of the autonomous vehicle.

18. The system of claim 16, wherein the operations further comprise authenticating, based on an authentication item associated with a received ride request, a passenger.

19. The system of claim 18, wherein the receiving the authentication item is received from at least one of a user device, an input component of the autonomous vehicle, or a sensor of the autonomous vehicle.

20. The system of claim 16, further comprising causing the autonomous vehicle to drive to the destination based at least on determining that a passenger has entered the autonomous vehicle.

21. The system of claim 16, further comprising departing from the destination based, at least, on a determination that a passenger has exited the autonomous vehicle.

22. The system of claim 16, wherein the operations further comprise:

determining, based on arriving at the destination, that a passenger has not exited the autonomous vehicle; and outputting, based on the determining that the passenger has not exited the autonomous vehicle, a notification.

* * * * *